US008218439B2

(12) United States Patent
Deshpande

(10) Patent No.: US 8,218,439 B2
(45) Date of Patent: Jul. 10, 2012

(54) METHOD AND APPARATUS FOR ADAPTIVE BUFFERING

(75) Inventor: Sachin G. Deshpande, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 936 days.

(21) Appl. No.: 11/274,694

(22) Filed: Nov. 14, 2005

(65) Prior Publication Data
US 2006/0109856 A1 May 25, 2006

Related U.S. Application Data

(60) Provisional application No. 60/630,854, filed on Nov. 24, 2004.

(51) Int. Cl.
*H04L 12/26* (2006.01)
*H04L 12/28* (2006.01)
*H04J 3/16* (2006.01)

(52) U.S. Cl. ............ 370/235; 370/230.1; 370/412; 370/413; 370/465

(58) Field of Classification Search .......... 370/232, 370/235, 236, 412, 230, 230.1, 231, 235.1; 709/232, 224
See application file for complete search history.

(56) References Cited

U.S. PATENT DOCUMENTS

| | | | | |
|---|---|---|---|---|
| 5,805,228 | A * | 9/1998 | Proctor et al. | 375/240.22 |
| 6,011,590 | A * | 1/2000 | Saukkonen | 375/240.05 |
| 6,304,574 | B1 * | 10/2001 | Schoo et al. | 370/401 |
| 6,310,857 | B1 * | 10/2001 | Duffield et al. | 370/232 |
| 6,343,321 | B2 | 1/2002 | Patki et al. | |
| 6,452,950 | B1 | 9/2002 | Ohlsson et al. | 370/516 |
| 6,487,721 | B1 * | 11/2002 | Safadi | 725/36 |
| 6,560,243 | B1 * | 5/2003 | Mogul | 370/468 |
| 6,683,889 | B1 | 1/2004 | Shaffer et al. | 370/516 |
| 6,684,273 | B2 | 1/2004 | Boulandet et al. | 710/52 |
| 6,744,768 | B2 * | 6/2004 | Vikberg et al. | 370/395.21 |
| 6,788,651 | B1 | 9/2004 | Brent et al. | 370/255 |
| 6,931,059 | B1 * | 8/2005 | Van Dusen et al. | 375/240.02 |
| 7,047,308 | B2 * | 5/2006 | Deshpande | 709/232 |
| 7,102,640 | B1 * | 9/2006 | Aholainen et al. | 345/440 |
| 7,111,058 | B1 * | 9/2006 | Nguyen et al. | 709/224 |

(Continued)

FOREIGN PATENT DOCUMENTS

JP 2000-307661 11/2000

(Continued)

OTHER PUBLICATIONS

Schulzrinne, H., et al., "Real Time Streaming Protocol (RTSP)", RFC 2326, Apr. 1998.

(Continued)

*Primary Examiner* — Marsha D Banks Harold
*Assistant Examiner* — Christopher Wyllie
(74) *Attorney, Agent, or Firm* — Stoloowitz Ford Cowger LLP

(57) ABSTRACT

An adaptive buffering scheme allows more effective media transport and buffering. In one aspect of the adaptive buffering scheme, buffering parameters are adapted to different media characteristics, such as media play commands or the amount of encoding/transcoding required for the particular media stream. In another aspect of the adaptive buffering scheme, buffering is adapted to different transmission or memory conditions, such as transmission rate, packet jitter, or the amount of available buffer memory. In one example, the adaptive buffering is supported using Real Time Streaming Protocol (RTSP), and/or Real Time Transport Protocol (RTP) and associated Real Time Control Protocol (RTCP), and/or Session Description Protocol (SDP) messages.

19 Claims, 5 Drawing Sheets

U.S. PATENT DOCUMENTS

| | | | |
|---|---|---|---|
| 7,356,079 B2* | 4/2008 | Laksono et al. | 375/240.03 |
| 7,359,324 B1* | 4/2008 | Ouellette et al. | 370/230 |
| 7,380,028 B2* | 5/2008 | Crinon et al. | 710/52 |
| 7,464,172 B2* | 12/2008 | Deshpande | 709/232 |
| 7,571,246 B2* | 8/2009 | Virdi et al. | 709/232 |
| 7,711,841 B2* | 5/2010 | Deshpande | 709/231 |
| 2001/0019585 A1* | 9/2001 | Lemaguet | 375/240.1 |
| 2002/0041326 A1* | 4/2002 | Driscoll et al. | 348/36 |
| 2002/0097750 A1* | 7/2002 | Gunaseelan et al. | 370/503 |
| 2002/0105951 A1* | 8/2002 | Hannuksela et al. | 370/389 |
| 2002/0131496 A1* | 9/2002 | Vasudevan et al. | 375/240.11 |
| 2002/0136298 A1* | 9/2002 | Anantharamu et al. | 375/240.12 |
| 2003/0053416 A1* | 3/2003 | Ribas-Corbera et al. | 370/233 |
| 2003/0053463 A1* | 3/2003 | Vikberg et al. | 370/395.1 |
| 2003/0061371 A1* | 3/2003 | Deshpande | 709/232 |
| 2003/0067877 A1* | 4/2003 | Sivakumar et al. | 370/232 |
| 2003/0152094 A1 | 8/2003 | Colavito et al. | 370/412 |
| 2003/0218981 A1* | 11/2003 | Scholten | 370/235 |
| 2004/0018005 A1* | 1/2004 | Gates et al. | 386/98 |
| 2004/0034863 A1* | 2/2004 | Barrett et al. | 725/38 |
| 2004/0057446 A1* | 3/2004 | Varsa et al. | 370/412 |
| 2004/0071088 A1* | 4/2004 | Curcio et al. | 370/235 |
| 2004/0098463 A1* | 5/2004 | Shen et al. | 709/213 |
| 2004/0186877 A1* | 9/2004 | Wang et al. | 709/200 |
| 2004/0190606 A1* | 9/2004 | Deshpande | 375/240.01 |
| 2004/0218626 A1* | 11/2004 | Tyldesley et al. | 370/464 |
| 2004/0242204 A1* | 12/2004 | Ido et al. | 455/412.1 |
| 2004/0255063 A1* | 12/2004 | Crinon et al. | 710/55 |
| 2004/0260828 A1* | 12/2004 | Price | 709/231 |
| 2005/0002453 A1* | 1/2005 | Chang et al. | 375/240.03 |
| 2005/0050557 A1* | 3/2005 | Gabryjelski et al. | 720/600 |
| 2005/0152397 A1* | 7/2005 | Bai et al. | 370/468 |
| 2005/0188407 A1* | 8/2005 | van Beek et al. | 725/81 |
| 2005/0237932 A1* | 10/2005 | Liu | 370/230 |
| 2005/0262261 A1* | 11/2005 | Deshpande | 709/231 |
| 2006/0026294 A1* | 2/2006 | Virdi et al. | 709/232 |
| 2006/0036759 A1* | 2/2006 | Shen et al. | 709/234 |
| 2006/0088000 A1* | 4/2006 | Hannu et al. | 370/328 |
| 2006/0109856 A1* | 5/2006 | Deshpande | 370/412 |
| 2007/0204056 A1* | 8/2007 | Deshpande | 709/231 |

FOREIGN PATENT DOCUMENTS

| | | |
|---|---|---|
| JP | 2002507375 | 3/2002 |
| WO | WO 99/52067 | 10/1999 |
| WO | WO 2004/008673 | 1/2004 |
| WO | WO 2006058203 | 6/2006 |

OTHER PUBLICATIONS

Jenkač, H., et al., "On Video Streaming over Variable Bit-Rate and Wireless Channels", *Packet Video*, France, 2003.

Narbutt, M., et al., "Adaptive Playout Buffering for Audio/Video Transmission over the Internet", *Proceedings of the IEEE 17$^{th}$ UK Teletraffic Symposium*, Ireland, May 2001.

Regunathan, S., et al., "A Generalized Video Complexity Verifier for Flexible Decoding", *IEEE Transactions on Circuits and Systems for Video Technology*, vol. 13, No. 7, Jul. 2003.

Digital Living Network Alliance (DLNA) RTP Guidelines, DLNA RTP Guidelines draftv067.doc, 2004.

International Search Report for International Application No. PCT/US05/42725 dated Apr. 5, 2007.

Written Opinion for International Application No. PCT/US05/42725 dated Apr. 5, 2007.

Office Action (Notification of Reasons for Refusal) for Patent Application No. 2007-543519, Japanese Patent Office, Dated Jan. 7, 2010.

WO 02/063461, World Intellectual Propery Organization (WIPO), Applicant Nokia Corporation, Inventors Miska Hannuksela, et al. Publication Date Aug. 15, 2002.

International Search Report and Written Opinion for PCT/US05/42725, mailing date Jun. 11, 2008.

Translation of Japanese Office Action for Japanese Patent Application No. 2007-543519, mailing date Aug. 4, 2009.

* cited by examiner

METHOD AND APPARATUS FOR ADAPTIVE BUFFERING

CROSS REFERENCE TO RELATED APPLICATIONS

This application claims the benefit of U.S. Provisional Application No. 60/630,854, filed Nov. 24, 2004, and is herein incorporated by reference.

BACKGROUND

Different buffering parameters are used when transferring media between two devices. For example, different jitter buffer and pre-decoder buffer parameters may be used in a rendering endpoint when buffering media is received from a serving endpoint. The rendering endpoint may send a Buffer Fullness Report (BFR) to the serving endpoint that includes a "Buffer Size" value. The buffer size value may include the size of the jitter and the size of the pre-decode buffer, if any.

However, other buffer information may also need to be communicated between the media serving endpoint and the media rendering endpoint. For example, there is a minimum buffer size (B) and a minimum initial buffer fullness or fill level (F) used for avoiding pre-decoder buffer underflow and overflow for a particular transmission rate (R). This is referred to as leaky bucket model.

There are a number of other scenarios where other buffer parameters may need to be dynamically changed during a media session. For example, wireless home network interference and cross-traffic can cause the amount of jitter to vary considerably between the media serving endpoint and the media rendering endpoint. Accordingly, the rendering endpoint may need to change the jitter buffer size to efficiently handle these jitter fluctuations. However, currently there is no communication protocol/extension that allows the rendering endpoint to communicate these jitter buffer changes to the serving endpoint.

The present invention addresses this and other problems associated with the prior art.

SUMMARY OF THE INVENTION

An adaptive buffering scheme allows more effective media transport and buffering. In one aspect of the adaptive buffering scheme, buffering parameters are adapted to different media characteristics, such as media play commands or the amount of encoding/transcoding required for the particular media stream. In another aspect of the adaptive buffering scheme, buffering is adapted to different transmission or memory conditions, such as transmission rate, packet jitter, or the amount of available buffer memory. In one example, the adaptive buffering is supported using Real Time Streaming Protocol (RTSP), and/or Real Time Transport Protocol (RTP) and associated Real Time Control Protocol (RTCP), and/or Session Description Protocol (SDP) messages.

The foregoing and other objects, features and advantages of the invention will become more readily apparent from the following detailed description of a preferred embodiment of the invention which proceeds with reference to the accompanying drawings.

DETAILED DESCRIPTION

Figure 1:
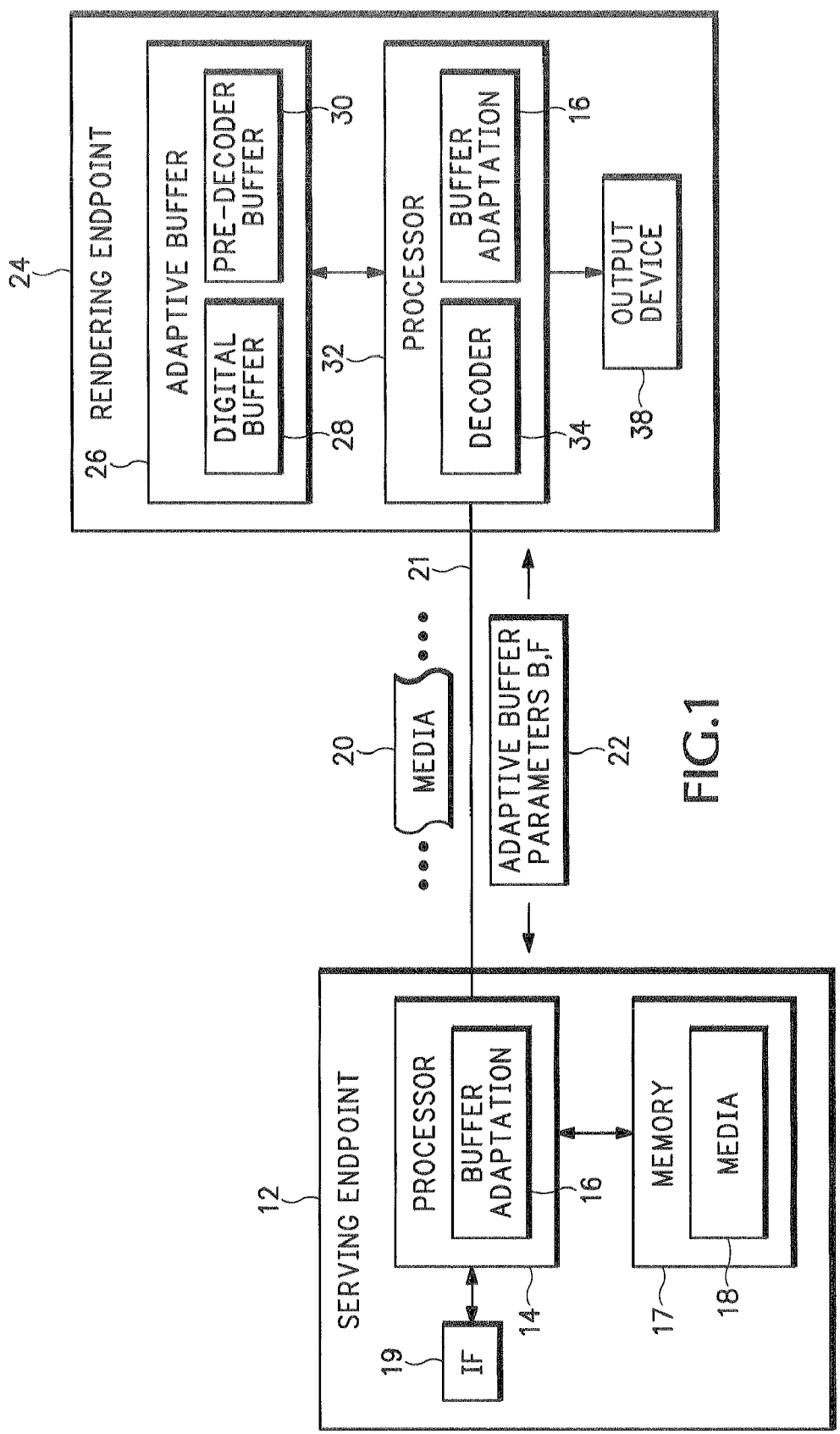
FIG. 1 is a diagram of an adaptive buffering system.

Referring to FIG. 1, a serving endpoint 12 provides media 20 to a rendering endpoint 24. Some examples of digital media serving endpoints 12 may include, but are not limited to, Advanced Set-Top Boxes (ASTBs), Digital Video Recorders (DVRs), personal and laptop computers, stereo and home theaters with hard disk drivers, broadcast tuners, video and image capture devices, such as cameras and camcorders, and multimedia mobile phones. Some examples of rendering endpoints 24 can include TV monitors, stereo and home theaters, Personal Digital Assistants (PDAs), multimedia mobile phones, wireless monitors, game consoles, digital media adapters (DMAs), or any other type of media output device.

A connection 21 between the server endpoint 12 and the rendering endpoint 24 can use any type of wired or wireless Internet Protocol (IP) based communication protocol. For example, the connection 21 may be a Local Area Network (LAN) connection or a wireless 802.11 connection. Of course other types of wired or wireless connections and communication protocols can also be used.

The serving endpoint 12 includes a processor 14 that encodes the media 18 and sends the encoded media stream 20 to rendering endpoint 24. The encoded media 20 transported over connection 21 can be any type of video, audio, image, or digital data. The media 18 can be received from an external interface 19, such as a Internet Protocol (IP) network interface, wireless cellular or IP based interface, Universal Serial Bus (USB) interface, etc.

Alternatively, the media 18 may be received from a camera, microphone, or other audio or video sensors connected to, or contained within, the serving endpoint 12. The serving endpoint 12 may store media 18 in a memory 17 or may simply forward the media 18 received over interface 19 to the rendering endpoint 24.

The rendering endpoint 24 may have a digital buffer 28 and/or a pre-decoder buffer 30. These buffers are also referred to by other names. For example, the digital buffer is alternatively referred to as a jitter buffer, receiver buffer, de-jitter buffer, playout buffer, etc. The pre-decoder buffer 30 is alternatively referred to as a decoder buffer or media buffer, to name a few examples. In the description below, the pre-decoder buffer 30 is used for media adaptation. For example, the pre-decoder buffer 30 can be used to avoid media overflow and underflow, which may otherwise happen due to the bit-rate fluctuations in the media bit stream 20. The digital buffer 28 compensates for variations in packet transmission rate, packet jitter or packet loss when the media 20 is transported over connection 21.

The digital buffer 28 and the pre-decoder buffer 30 in FIG. 1 are logical representations and may be contained within separate memory devices or contained within the same memory device or buffer 26. In actual implementation, it may be sub-optimal to have a separate digital buffer 28 and pre-decoder buffer 30, especially for variable bit-rate transmissions. However, for explanation purposes, adaptive buffering is explained below in the context of a pre-decoder buffer 26 and a digital buffer 28.

Media Adaptation

The processor 14 in the serving endpoint 12 and processor 32 in the rendering endpoint 24 each operate buffer adaptation software 16 that exchange buffer parameters 22 adapted to changing media and transmission conditions. The processor 14 may also adapt the trans-coding of media 18 according to different media or transmission conditions. Accordingly, the processor 32 in rendering endpoint 24 may vary the buffer parameters associated with buffer 26 according to the adapted buffer parameters 22 received from serving endpoint 12. The processor 32 then uses a decoder 34 to decode the media 20 in buffer 26 before outputting the media to an output device 38, such as a display screen and/or speaker device.

Figure 2:
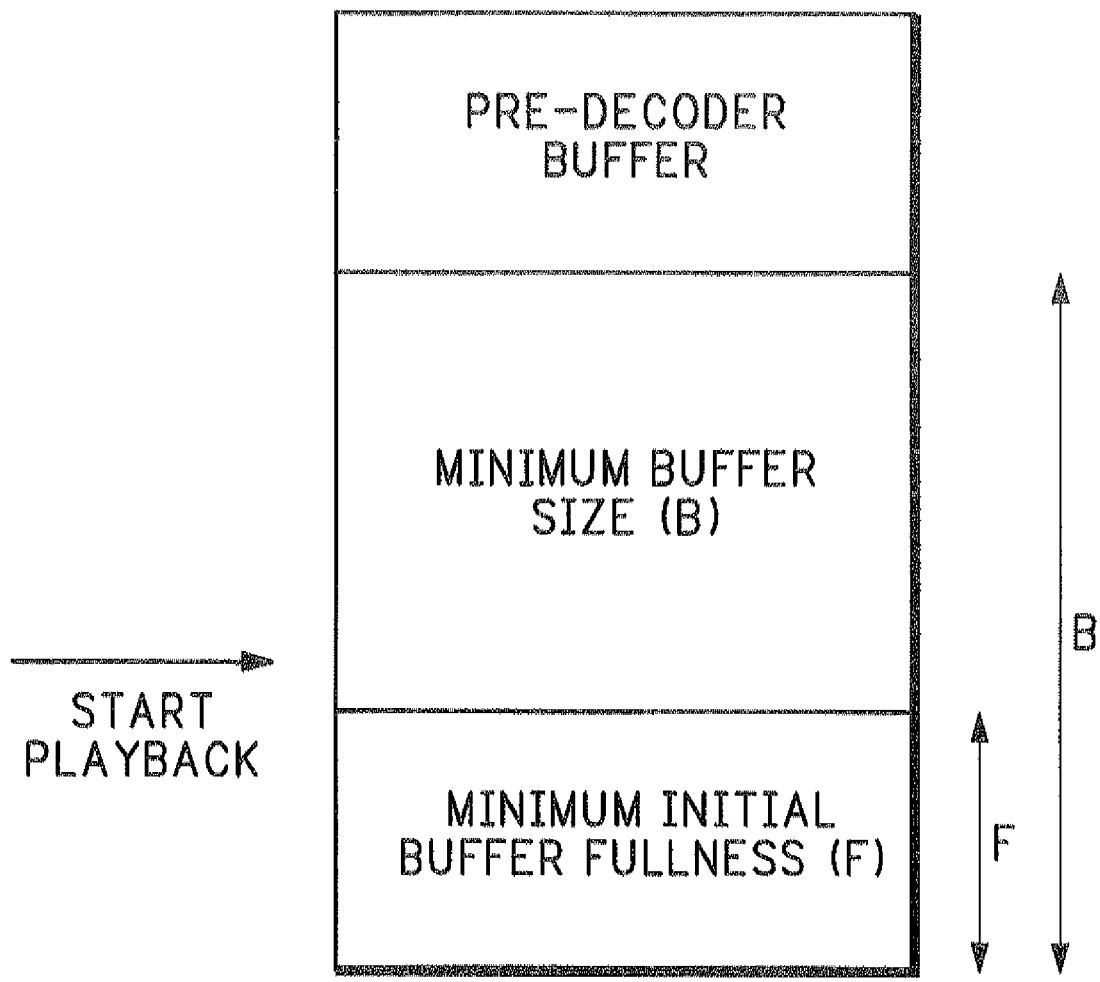
FIG. 2 is a more detailed block diagram of a pre-decoder buffer.

FIG. 2 shows in more detail two different buffer parameters that are associated with the pre-decoder buffer 30 shown in FIG. 1. The pre-decoder buffer 30 may use a minimum buffer size (B) and a minimum initial buffer fullness (F) to ensure no media overflow or underflow occurs. For example, the serving endpoint 12 may encode a live media stream 18 in such a manner so that the associated B and F values specified in message 22 will contain the encoded media stream 20 in the leaky bucket.

Referring to FIGS. 1 and 2, in the case of a pre-encoded media stream 18, the B and F values in message 22 can be specified by the serving endpoint 12 for a particular rate R. In addition, the serving endpoint 12 may support trans-rating the media 18 to various different (lower) rates. In this case, the B and F values in message 22 may be specified either for all the different rates supported by the serving endpoint 12 or only for the minimum supported values.

The minimum buffer size value B and the minimum initial buffer fullness value F may be specified and dynamically changed during the media session while the media stream 20 is being sent from the serving endpoint 12 and being buffered by the rendering endpoint 24. In one example, the behavior of the pre-decoder buffer 30 can be specified by the hypothetical reference decoder (e.g., MPEG2 Video Buffering Verifier—VBV, H264/AVC—Generalized Hypothetical Reference Decoder, etc.).

The rendering endpoint 24 at the time of bit stream setup (e.g., sending RTSP SETUP request) may not have knowledge of the buffer values B and F, since it has not received the media bit stream 20 yet and may not have information about particular media constraints. The pre-decoder buffer parameters B and F can also change in mid-stream. For example, the media 18 may be encoded using either a Constant Bit Rate (CBR) or Variable Bit Rate (VBR) encoder. In the VBR encoding scheme, the encoded media 20 may have a varying bit rate during the media session. Even CBR encoded media may have a changing media bit rate. The buffer parameters B and F can be adapted by the serving endpoint 12 for these changing bit rates and then sent to the rending endpoint 24 to optimize media transfer, buffering, and playout.

Adapting Buffer Parameters for Different Media Control Operations

Figure 3:
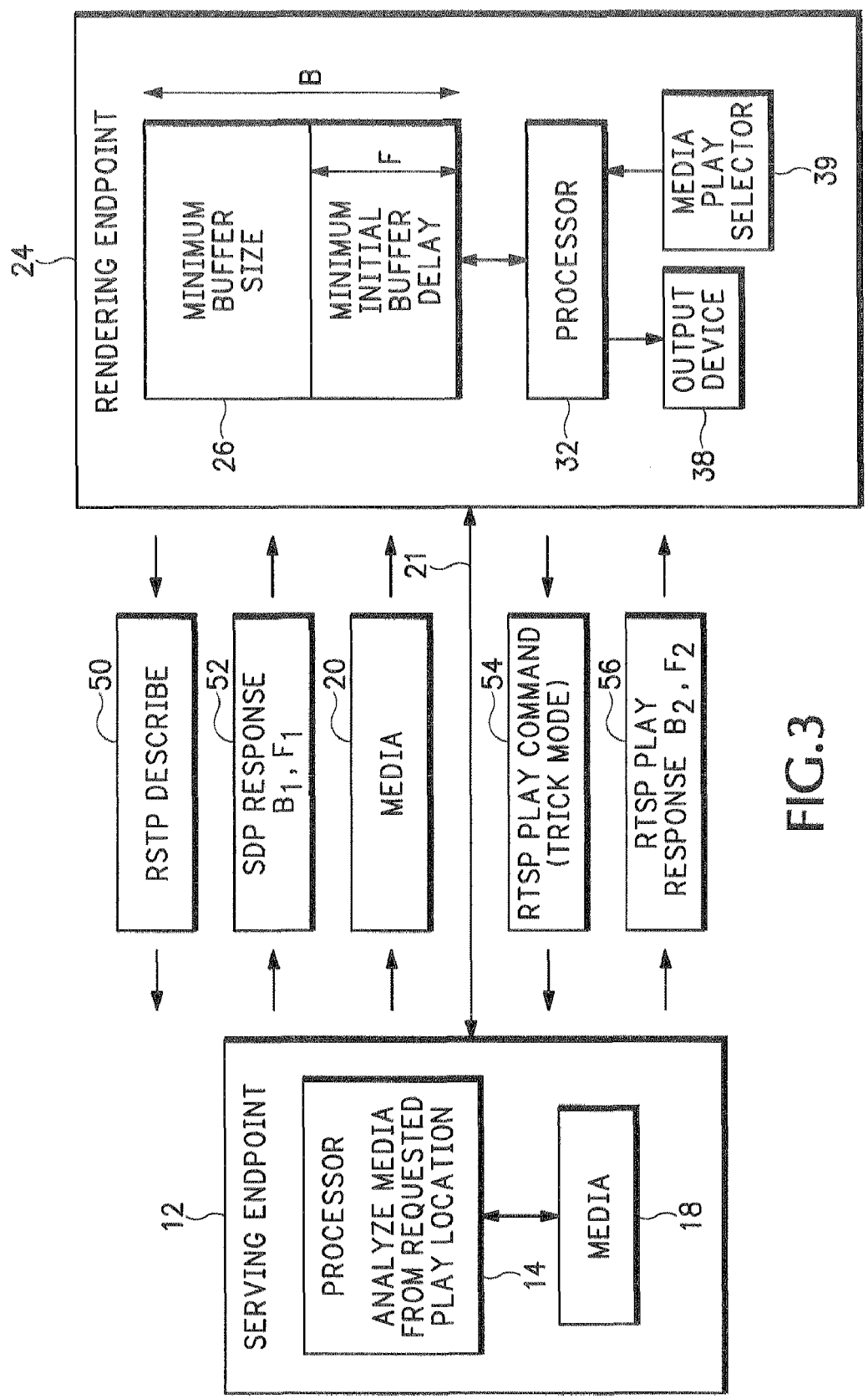
FIG. 3 is a diagram showing how buffer parameters are adapted to different media play commands.

FIG. 3 shows in more detail how buffer parameters are adapted to different media play operations. There are different RTSP play requests 54 that are sent from the rendering endpoint 24 to the serving endpoint 12. These play requests 54 can be alternatively referred to as trick mode requests and can include any media operation that may change how or which media frames are transmitted over connection 21. For example, the play requests 54 can include fast forward, rewind, skip, pause operations, etc. The adaptive buffering scheme can adapt the buffer parameters B and F for these different play requests 54.

For example, the rendering endpoint 24 may initiate a media session by sending a RTSP DESCRIBE message 50 to the serving endpoint 12. The serving endpoint 12 may then send a SDP response 52 that includes, among other things, an initial minimum buffer size $B_1$ and minimum initial buffer fullness $F_1$. One particularly interesting aspect is that the SDP response 52 also includes the minimum required buffer size Bmin and can also include minimum initial buffer fullness Fmin. The SDP response 52 may also include other information associated with the media stream 20 such as the transport information, bit rate, title, author, etc.

The rendering endpoint obtains the information about the buffer parameters from the server from the SDP description. The rendering endpoint 24 can send a RTSP SETUP request with the buffer size value if it satisfies the minimum buffer size requirement (Bmin). The rendering endpoint 24 may specify a value for the Buffer Size which is equal to or larger than the minimum required buffer size (Bmin) specified by the serving endpoint 12.

At this point, or also later during the media session, the rendering endpoint 24 may send a RTSP play command 54 that may include a range header and/or a scale and/or a speed header. As described above, the RTSP play command 54 may include any of the media control operations alternatively referred to as trick modes, such as, fast forward, rewind, pause, skip, etc. For example, the RSTP play command 54 may request the serving endpoint 12 to skip forward to approximately the middle of the media stream 18.

Accordingly, the processor 14 in serving endpoint 12 analyzes the media 18 from the requested play location and calculates, if necessary, new pre-decoder buffer values $B_2$ and/or $F_2$. The serving endpoint 12 then sends the new decoder buffer values $B_2$ and/or $F_2$ to the rendering endpoint 24 in RTSP play response 56. The processor 32 in rendering endpoint 24 then reconfigures buffer 26 with the new buffer parameters $B_2$ and/or $F_2$.

There are several factors that may cause the processor 14 to readjust the buffer values B and F according to the play command 54. For example, the remaining amount of media 18 corresponding to the play command 54 may be less than the current minimum buffer size $B_1$. This could possibly cause processor 14 to send an updated smaller minimum buffer size $B_2$ to the rendering endpoint 24.

Further, the video frames at the location selected in the media play command 54 may be requiring or may be able to be transcoded into a smaller amount of data than the frames at the current location in the media stream 18. For example, the frames at a selected middle media stream location may have less video information (e.g., uniform blue sky) than the frames at the beginning of the media stream 20 (e.g., fight scene). Accordingly, the minimum initial buffer fullness $F_2$ required at the new selected media stream location may be less than the previous minimum initial buffer fullness $F_1$.

The processor 14 in serving endpoint 12 determines both the minimum buffer size B and minimum initial buffer fullness F corresponding with the play command 54 and then includes the adapted buffer parameters $B_2$ and $F_2$ in the RSTP play response 56. This could result in shorter play out delays after a user sends a new play command. For example, a smaller identified minimum initial buffer fullness F may require less initial buffering by the rendering endpoint 24 prior to media playout.

The serving endpoint 12 may not be able to determine what B and/or F parameters to use for the play command 54, or may determine that no new pre-decoder values are required. In these situations, no new B and/or F buffer values are supplied in the play response 56. If the serving endpoint 12 determines only the B or F value should be varied in response to the play command 54, only the corresponding adapted $B_2$ or $F_2$ value is sent in response 56.

The serving endpoint 12 then starts sending the media stream 20 to the rendering endpoint 24 in packets using a protocol such as the Real Time Transport Protocol (RTP). The rendering endpoint 24 then buffers the received media stream 20 according to the buffers parameters $B_2$ and $F_2$.

Rate Adaptation

The buffer adaptation described immediately above adapts buffer parameters to changing media characteristics. However, buffer adaptation can also be used to accommodate changing transmission conditions. For example, buffer parameters can also be adapted to accommodate interference while transmitting the media 20 over a wireless or hardwired transmission connection 21. In another example, buffer adaptation may accommodate changing transmission rates in best effort type communication channels.

There are still other situations where the adaptive buffering scheme may adapt buffers parameters to changes in available buffer memory in the rendering endpoint 24. For example, the rendering endpoint 24 may have a given amount of available buffer memory. The rendering endpoint 24 may have a different amount of available buffer space at the initiation of the media session, than at another time during the media session.

The buffer adaptation scheme adapts the buffer parameters to these changes in available buffer space to provide more efficient media transport. For example, the transmit rate may be increased when there is more available buffer space. It is also important to note that buffer adaptation is not limited just to varying buffer parameters and can also vary other media operations, according to monitored buffer values, such as the type of media encoding.

Figure 4:
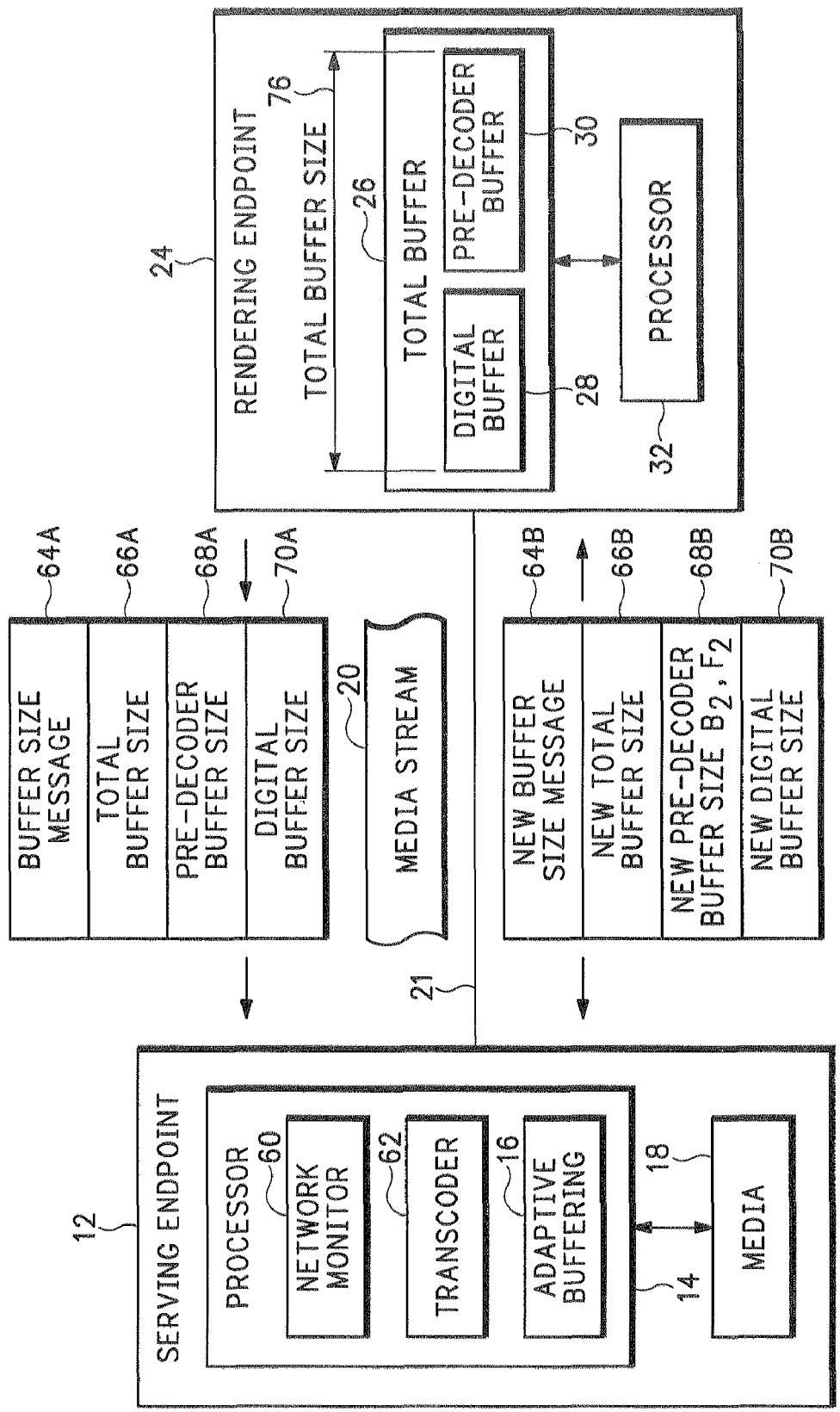
FIG. 4 is a diagram showing how digital and/or pre-decoder buffer parameters are varied using the adaptive buffering system.

Referring to FIG. 4, the digital buffer 28 in the rendering endpoint 24 is used for compensating for transmission variances in the communication channel 21. For example, the digital buffer 28 can be used to account for packet jitter when media 20 is transmitted from the serving endpoint 12 to the rendering endpoint 24. As also mentioned above, the digital buffer 28 and the pre-decoder buffer 30 are logical representations and may both be part of a same buffer space 26. It should also be understood that the rendering endpoint 24 may only be configured with a single digital buffer 28 or pre-decoder buffer 30, or may be configured with both. In the explanation below, a total buffer size 76 takes into account whatever combination of buffers 28 and/or 30 are used in rendering endpoint 24.

The serving endpoint 12 may include a network monitor 60 and a transcoder 62 that are operated by processor 14 or operated by other processors. The network monitor 60 monitors the connection 21 for different transmission parameters such as packet jitter and packet delay and/or receives feedback from rendering endpoint 24 about the network conditions. The transcoder 62 may encode the media 18 according to the buffering parameters exchanged between the serving endpoint 12 and rendering endpoint 24.

In this example, a first buffer size message 64A is sent either from the serving endpoint 12 to the rendering endpoint 24 or sent from the rendering endpoint 24 to the serving endpoint 12. The buffer size message 64A can include any combination of buffer parameters that may include a total buffer size value 66A, a pre-decoder size value 68A and/or a digital buffer size value 70A. Alternatively, or in addition, the buffer size message 64A may indicate how much space is currently available in total buffer 26, digital buffer 28, and/or pre-decoder buffer 30.

The serving endpoint 12 may send the buffer size message 64A to the rendering endpoint 24 indicating how much memory to allocate to any one of the buffers 26, 28, and/or 30. For example, the serving endpoint 12 may direct the rendering endpoint 24 to use particular buffer sizes 66A, 68A and/or 70A according to the type of media 18.

Alternatively, the rendering endpoint 24 may send the buffer size message 64A to identify what buffer space is currently supported in buffers 26, 28, and/or 30. The serving endpoint 12 may then use different transmission rates and/or encoding adaptations according to the identified buffer parameters in message 64A. For example, transcoder 62 may use an encoder that generates less encoded media 20 when the buffer size message 64A indicates the digital buffer 28 has a smaller size. The serving endpoint 12 may also transmit media 20 at different transmission or bit rates according to the available buffer space identified in message 64A.

In yet another application, the serving endpoint 12 may specify a different minimum buffer size $B_2$, minimum initial buffer fullness $F_2$ in pre-decoder buffer values 68B according to the available buffer size parameters identified in buffer size message 64A. In another scenario, the serving endpoint 12 may send a new digital buffer size value 70B according to the available buffer size parameters identified in buffer size message 64A.

It should also be noted that the buffer size messages 64A and 64B can be sent either before or after the media session 20 is established and can be sent either by the serving endpoint 12 or by the rendering endpoint 24. In addition, the buffer size message 64 may be independently sent by the rendering endpoint 24, for example, whenever the current buffer utilization or availability changes in any of the buffers 26, 28, and/or 30. For example, a new buffer size message 64 may be automatically sent by the rendering endpoint 24 whenever data in one of the buffers rises above or falls below different predetermined fullness thresholds. Alternatively, the rendering endpoint 24 may periodically send buffer size messages 64 regardless of changes in the buffer values.

In yet another embodiment, the serving endpoint 12 may send a message to the rendering endpoint 24 requesting any of the current buffer values 66, 68, and/or 70. The rendering endpoint 24 then sends the buffer size message 64 in response to the request message sent by the serving endpoint 12. This may happen for example, when the serving endpoint 12 determines additional bandwidth is available for transmitting media stream 20. However, the serving endpoint 12 first needs to verify the rendering endpoint 24 has enough buffer capacity to handle the increased media transmission rate. Alternatively, the serving endpoint 12 may send a buffer size message 64 to the rendering endpoint 24 to increase the size of digital buffer 72 when network monitor 60 detects increased jitter.

Thus, the serving endpoint 12 and the rendering endpoint 24 may independently send buffer size messages 64 at different times that correspond to different media, network, and/or buffer size conditions or in response to buffer size messages previously received from the other endpoint. These of course, are only of few examples of the numerous different scenarios that may prompt one of the serving endpoint 12 or rendering endpoint 24 to send a buffer size message 64.

Communication Protocols

Figure 5:
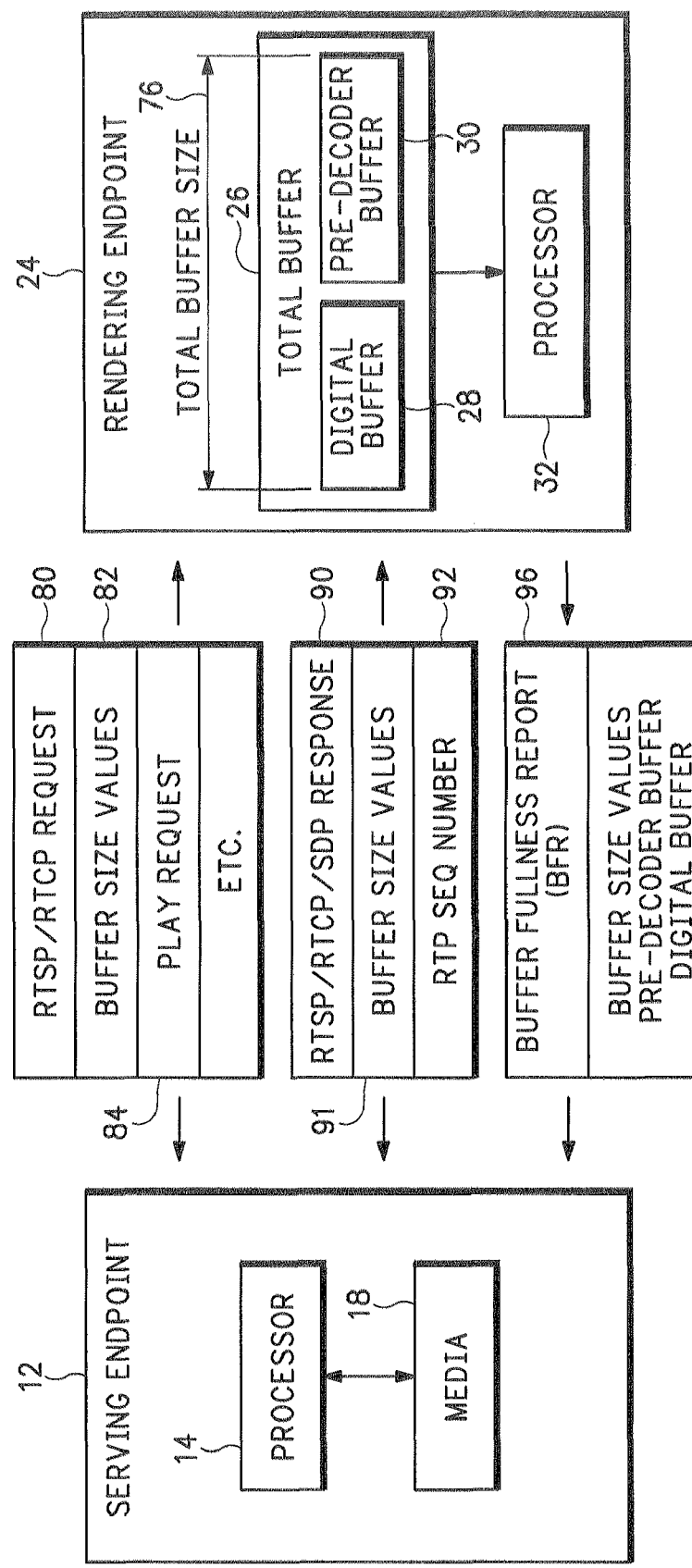
FIG. 5 is a diagram showing different message protocols that can be used in the adaptive buffering system.

FIG. 5 shows some of the different protocols that can be used to send and request buffer parameters. In one implementation, the buffer parameter messages may be sent using a Real Time Streaming Protocol (RTSP) or Real Time Control Protocol (RTCP) request 80. A RTSP SET_PARAMETER, ANNOUNCE, or OPTIONS method may also be used to send any changes to the buffer parameters.

The endpoint receiving the request 80 may respond with a RTSP, RTCP, or Session Description Protocol (SDP) response 90. In an alternative embodiment, the buffer parameters may be sent from the rendering endpoint 24 using a RTCP Buffer Fullness Report (BFR) 96.

The rendering endpoint 24 can send a RTSP SETUP request 80 that contains the buffer size values 82 that satisfy a minimum buffer size requirement. The rendering endpoint 24 may specify buffer size values 82 which are equal to, or larger than, the minimum required buffer size specified by the serving endpoint 12. If the rendering endpoint 24 specifies a buffer size value 82 less than the absolute minimum required buffer size B specified by the serving endpoint 12, the serving endpoint 12 may either reject the SETUP request 80 or may specify the lowest supportable buffer parameters 91 in RTSP SETUP response header 90.

As described above, the rendering endpoint 24 can use the RTSP SET_PARAMETER/OPTIONS/ANNOUNCE technique to signal a change in the size 76 of buffer 26 to the serving endpoint 12. This may happen in several different situations. For example, the rendering endpoint 24 may increase the size of buffers 28, 30, 26 when there is increased jitter. The rendering endpoint 24 may also increase the size of buffer 28, 30, 26 according to media control operations, such as for particular trick modes.

A memory constrained rendering endpoint 24 may send a message 80 or 96 indicating additional memory has freed up (e.g., due to completion of other processes, etc.). The serving endpoint 12 may accordingly send new buffer parameters in response message 90, according to the remaining media 18 and available encoders. This allows the serving endpoint 12 to provide better rate adaptation. A sub case of this scenario may include the rendering endpoint 24 supporting a "growing buffer size" 76. For example, a rendering endpoint 24 with large memory resources (e.g., Personal Computers) may initially select a buffer size 76 which can grow later to allow faster than real-time media transfer.

In another aspect of the adaptive buffering scheme, the response message 90 may also include a RTP sequence number 92 that is associated with the media packet where the new buffer size values 91 should start being used.

Other embodiments may include using a RTSP GET_PARAMETER message 80. The GET_PARAMTER message 80 can be used by the serving endpoint 12 to obtain the current buffer size 76 at the rendering endpoint 24. The GET_PARAMETER message 80 can also be used by the rendering endpoint 24 to obtain current buffer parameters used by the serving endpoint 12 for the media stream currently being transmitted.

As described above, the total buffer size 76, total digital buffer size 70 for digital buffer 28, total pre-decoder buffer size 68 for pre-decoder buffer 30 at the rendering endpoint 24 can also be sent as a part of the Buffer File Report (BFR) RTCP message 96 as defined in the RTP guidelines. In this case, an additional RTCP transport layer feedback message can be used to indicate the total size of buffer 26. Separate digital buffer size (jitter buffer size) 70 and pre-decoder buffer size 68 (FIG. 4) can also be specified by the rendering endpoint 24. Explicit rules can be used by the rendering endpoint 24 to determine which current buffer parameters to specify.

SDP Media Attributes

The server endpoint 12 in one example can use the following SDP media-level attributes to specify minimum buffer requirements.

a=predecbufsize.dlna.org: <value>

This specifies the required minimum buffer size (B) in bytes for the "default"/"recommended" media stream.

a=X-mininitialbuffering.dlna.org: <value>

This specifies the minimum initial buffering (F) the rendering endpoint should provide for the "default"/"recommended" media stream. Alternatively this value can be specified in time units.

a=adaptation-predecbufsize.dlna.org: <value>

This specifies the absolute minimum buffer size (Bmin) in bytes that the rendering endpoint must have to render the media stream. This attribute can be present if the serving endpoint supports trans-rating the media stream. The rendering endpoint 24 may first use the identified recommended minimum buffer size B. However, when the recommended minimum buffer size B is not available, the rendering endpoint 24 can alternatively use the absolute minimum buffer size Bmin.

a=X-absmininitialbuffering.dlna.org: <value>

This specifies the minimum initial buffering (Fmin) in bytes that the rendering endpoint 24 should provide when using the buffer size specified by the <value>for the a=X-absminbufsize.dlna.org line. Alternatively this value can be specified in time units. This attribute can be present if the serving endpoint 12 supports trans-rating the stream.

RTSP Headers Used In Response to PLAY Request

Predec-Buffer-Size.dlna.org: <value>

This specifies the required minimum buffer sizes (B) in bytes for the media streams specified by URLs (in the <value>) which will be sent by the serving endpoint 12 in response to the play request from the rendering endpoint 24.

For example: Predec-Buffer-Size.dlna.org: url=video; size=782000, url=video;size=18245

Initial-Buffering.dlna.org: <value>

This value specifies the required minimum initial buffering in bytes or time units (F) the rendering endpoint 24 should provide for the media streams specified by URLs (in the <value>) which will be sent by the serving endpoint 12 in response to the request from the rendering endpoint 24.

For example: Initial-Buffering.dlna.org: url=video; time=1500, url=audio;time=1000

RTSP SET_PARAMETER Parameters

PMinbufsize.dlna.org: <value>

This parameter specifies the required minimum buffer size (B) in bytes for the media stream which will be sent by the serving endpoint 12 from this point onward.

PMininitialbuffering.dlna.org: <value>

This parameter specifies the required minimum initial buffering in bytes (F) the rendering endpoint 24 should provide for the media stream which will be sent by the serving endpoint 12 from this point onward.

BFR-Size.dlna.org: <value>

This specifies the size of the digital buffer 28 and/or pre-decoder buffer 30 at the rendering endpoint 24.

Alternatively the above parameters can be sent using RTSP headers instead of using the RTSP OPTIONS or SET_PARAMETER or ANNOUNCE method.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. I claim all modifications and variation coming within the spirit and scope of the following claims.

The invention claimed is:

1. A media server, comprising:
one or more processors configured to: monitor a media session to detect two or more media stream connection conditions occurring during the media session wherein a media stream is streaming between the media server and a particular rendering endpoint;
generate a first message in response to the detected media stream connection conditions;
responsive to the detected media stream connection conditions, send the first message to the particular rendering endpoint during the media session, wherein the message identifies new buffer information parameters to be used at the rendering endpoint for buffering the media stream or requests identification of current buffer information used at the rendering endpoint, or combinations thereof;
receiving a second message from the rendering endpoint identifying the buffer parameters for buffering the media stream during the media streaming session;
wherein the second message is one of a response containing current buffer parameters if the first message is the request for identification of the current buffer parameters or an automatically generated message identifying a predetermined buffer fullness threshold has been exceeded;
wherein the two or more media stream connection conditions correspond to: an amount of available buffer memory, available bandwidth, a media stream transmission rate, an amount of packet delay in the media stream an amount of packet jitter in the media stream, a media play command, an amount of transcoding to be performed on the media stream or an amount of encoding to be performed on the media stream, or combinations thereof;
wherein the new buffer parameters in the first message and the current buffer parameters in the second message are responsive to changes in the media stream connection conditions corresponding to at least one of packet jitter, packet delay or media encoding;
wherein the buffer parameters include a minimum buffer size value and a minimum initial buffer fullness value which are responsive to the detected to the changes in at least two media stream connection conditions;
wherein the new buffer parameters are responsive to the two or more of the detected connection conditions.

2. The media server according to claim 1, wherein the new buffer parameters includes both a minimum initial buffer fullness value and a minimum buffer size value.

3. The media server according to claim 1, wherein the new buffer parameters includes jitter buffer parameters or pre-decoder buffer parameters, or combinations thereof.

4. The media server according to claim 1, wherein the new buffer parameters and the current buffer parameters are exchanged with the particular rendering endpoint using Real Time Streaming Protocol (RTSP) or Real Time Control Protocol (RTCP) messages, or combinations thereof.

5. The media server according to claim 1, the one or more processors further configured to dynamically adjust media transcoding during the media session according to an available buffer size indicated in the second message received from the particular rendering endpoint.

6. The media server according to claim 1, the one or more processors further configured to:
send the first message according to a media play request received from the rendering endpoint; and
identify media associated with the media play request and coding requirements for the identified media; and
send the new buffer information to the rendering endpoint adapted to the identified coding requirements.

7. A media processing device, comprising:
a processor configured for:
sending a first message to a serving endpoint identifying first buffer parameters for buffering a media stream during a media streaming session;
receiving a second message from the serving endpoint identifying second buffer parameters for buffering the media stream during the media streaming session;
wherein the processor is configured to send the first message and receive the second message during a current media session occurring between the media processing device and the serving endpoint, wherein the first and second messages identify changes in available local buffer space while the media stream is being buffered;
a monitor for monitoring the current media session to detect two or more media stream connection conditions occurring during the current media session wherein the one or more connection conditions correspond to: an amount of available buffer memory, available bandwidth, a media stream transmission rate, packet delay, an amount of packet jitter in the media stream, a media play command, an amount of transcoding to be performed on the media stream or an amount of encoding to be performed on the media stream, or combinations thereof;
wherein the first message and the second message are responsive to the detected two or more connection conditions occurring during the current media session detected while the media stream is being buffered;
wherein the second buffer parameters are responsive to changes in the media stream connection conditions corresponding to at least one of: the detected packet jitter, detected packet delay or detected media encoding;
wherein the second buffer parameters include a minimum buffer size value and a minimum initial buffer fullness value responsive to the changes in two or more media stream connection conditions; and
wherein the processor dynamically configures a local buffer at a rendering endpoint according to the received buffer parameters indicated in the second message while the local buffer is buffering the media stream.

8. The media processing device according to claim 7, wherein the processor sends messages to the serving endpoint that identify changes in the local buffer parameters responsive to variances in a network reception rate during the current media session.

9. The media processing device according to claim 8, wherein the processor receives new buffer parameters from the serving endpoint adapted to the identified changes in the local buffer parameters.

10. The media processing device according to claim 7, wherein the processor receives messages identifying a minimum pre-decoder buffer size value or a minimum initial pre-decoder buffer fullness value, or combinations thereof.

11. The media processing device according to claim 7, wherein the first and second messages sent and received by the processor are Real Time Streaming Protocol (RTSP), or Real Time Transport Protocol (RTP), or combinations thereof and associated Real Time Control Protocol (RTCP), or Session Description Protocol (SDP) messages, or combinations thereof.

12. The media processing device according to claim 7, wherein at least some of the received messages include new buffer parameters and a packet sequence number identifying media packets that should use the new buffer parameters.

13. The media server according to claim 7, wherein the processor receives a third message containing third buffer parameters that are dynamically adapted to two or more of the identified changes in the available local buffer space.

14. The media processing device according to claim 10, the processor further for sending different media play requests to a serving endpoint and receiving back third buffer parameters identifying the minimum pre-decoder buffer size value or the minimum initial pre-decoder buffer fullness value, or combinations thereof adapted to the media corresponding with the media play requests.

15. The media processing device according to claim 7, wherein the processor is further for receiving fourth buffer parameters identifying a minimum pre-decoder buffer size value or a minimum initial pre-decoder buffer fullness value, or combinations thereof.

16. A method for buffer adaptation, comprising:
sending a first message to a rendering endpoint identifying first buffer parameters for buffering a media stream during a media streaming session;
receiving a second message from the rendering endpoint identifying second buffer parameters for buffering the media stream during the media streaming session;
wherein the first message and the second message are responsive to two or more media stream connection conditions occurring during the current media streaming session detected while the media stream is being buffered;
wherein the two or more media stream connection conditions correspond with: an amount of available buffer memory, available bandwidth, the media stream transmission rate, an amount of packet jitter in the media stream, an amount of packet delay in the media stream, an amount of available pre-decoder buffer space, a media play command, an amount of transcoding to be performed on the media stream or an amount of encoding to be performed on the media stream, or combinations thereof;
wherein the buffer parameters in the first message and the second message are responsive to changes in the media stream connection conditions corresponding to at least one of packet jitter, packet delay or media encoding, or combinations thereof;
wherein the first buffer parameters include a minimum buffer size value and a minimum initial buffer fullness value responsive to the changes in at least two media stream connection conditions: and
dynamically configuring a local buffer at the rendering endpoint according to the received buffer parameters indicated in the second message while the local buffer is buffering the media stream.

17. The method according to claim 16, further comprising:
sending a third message to the endpoint containing first new buffer parameters adapted to changes detected in the media stream connection conditions responsive to the adjusting; and
receiving a fourth message from the endpoint containing second new buffer parameters adapted to changes detected in the media stream connection conditions responsive to the adjusting.

18. The method according to claim 16, further comprising sending the third and the fourth messages either periodically, according to monitored changes in available buffer space, or in response to an available buffer space query message.

19. A method for buffer adaptation, comprising:
sending a first message to a rendering endpoint identifying first buffer parameters for buffering a media stream;
receiving a second message from the rendering endpoint identifying second buffer parameters for buffering the media stream;
sending the media stream to the rendering endpoint or receiving the media stream related feedback from the rendering endpoint, or combinations thereof;
sending a third message to the rendering endpoint identifying first new buffer parameters responsive to detecting changes in the media stream connection conditions associated with sending or receiving the media stream; and
receiving a fourth message from the rendering endpoint identifying second new buffer parameters responsive to detecting changes in the media stream connection conditions associated with sending or receiving the media stream;
wherein the third and fourth buffer parameters are responsive to two or more of the changes,
wherein the media stream connection conditions correspond with: an amount of available buffer memory, available bandwidth, the media stream transmission rate, an amount of packet jitter in the media stream, an amount of packet delay in the media stream, an amount of available pre-decoder buffer space, a media play command, an amount of transcoding to be performed on the media stream or an amount of encoding to be performed on the media stream, or combinations thereof.

* * * * *

UNITED STATES PATENT AND TRADEMARK OFFICE
CERTIFICATE OF CORRECTION

| | | |
|---|---|---|
| PATENT NO. | : 8,218,439 B2 | Page 1 of 1 |
| APPLICATION NO. | : 11/274694 | |
| DATED | : July 10, 2012 | |
| INVENTOR(S) | : Sachin G. Deshpande | |

It is certified that error appears in the above-identified patent and that said Letters Patent is hereby corrected as shown below:

Title page, at Column 2 item (74), (Attorney, Agent or Firm), delete "Stoloowitz" and insert --Stolowitz--, therefore.

Title page 2, at Column 2 item (56), (Other Publications), Line 17, delete "Propery" and insert --Property--, therefore.

In the Claims:

At Column 9, Line 29, Claim 1, after "buffer" delete "information".

At Column 10, Line 17, Claim 6, delete "information" and insert --parameters--, therefore.

At Column 11, Line 20, Claim 14, delete "claim 10," and insert --claim 7,--, therefore.

At Column 12, Lines 2-3, Claim 16, delete "encoding, or combinations thereof;" and insert --encoding--, therefore.

At Column 12, Line 7, Claim 16, delete "conditions:" and insert --conditions;--, therefore.

Signed and Sealed this
Second Day of September, 2014

Michelle K. Lee
*Deputy Director of the United States Patent and Trademark Office*